March 6, 1956  J. H. BARNES  2,737,422
TRIM AND PROTECTIVE MEMBER FOR ATTACHMENT TO AN
AUTOMOBILE TIRE AND WHEEL ASSEMBLY
Filed Dec. 19, 1955

INVENTOR.
JAMES H. BARNES
BY Oldham & Oldham
ATTYS.

United States Patent Office 2,737,422
Patented Mar. 6, 1956

2,737,422

TRIM AND PROTECTIVE MEMBER FOR ATTACHMENT TO AN AUTOMOBILE TIRE AND WHEEL ASSEMBLY

James H. Barnes, Wadsworth, Ohio

Application December 19, 1955, Serial No. 553,819

6 Claims. (Cl. 301—37)

This invention relates to protective and decorative trim members for attachment to an automobile pneumatic tire and wheel assembly. This application is a continuation-in-part of my prior application, Serial No. 501,551, filed April 15, 1955.

Heretofore, there have been some efforts made to provide decorative trim members for association with pneumatic tire and wheel assemblies which members are adapted to dress up an ordinary black tire and give it the attractive appearance of a white sidewall tire. Some of such prior efforts, insofar as I am aware, have resulted in trim members that have been loosely associated with the pneumatic tire sidewall and may have vibrated or flapped excessively when in use. Yet other types of trim members required special reenforcing springs therein in order to hold the trim member in operative engagement with the tire sidewall. Certain of such previous types of sidewall trim members have been covered in patents, such as French Patent No. 1,061,278 and U. S. Patents Nos. 2,573,996; 2,691,550 and applicant's own prior Patents Nos. 2,621,979 and 2,696,409. In general, insofar as I am aware, none of such prior trim members have ever had any success commercially and apparently were never produced because of the foregoing and other reasons, or disadvantages associated with such prior constructions.

It is the general object of the present invention to provide a new and improved type of a protective and decorative trim member for operative engagement with a pneumatic tire and wheel assembly which member is characterized by being made solely of rubber or rubber-like material and by the resilient but firm engagement provided between the member and the tire sidewall when operatively engaged therewith, being held in position by a skirt portion in engagement with a tire rim flange and the tire bead.

Another object of the invention is to mold a sidewall trim member to an initial shape so that it must be flexed to engage a tire and wheel assembly and to build forces in the trim member holding it resiliently against the tire sidewall.

Another object of the invention is to provide a trim member of the class described wherein the trim member extends radially of the tire to a point radially inwardly of the bulge or maximum width portion of the tire sidewall when inflated.

Another object of the invention is to provide a thickened reinforcing rib at the radially outer peripheral edge of a trim member and to bevel or feather such edge to aid in keeping such edge free from vibration at high speed and to prevent wind from catching under the trim edge to move the trim member away from operative engagement with the sidewall portion of the tire.

Another object of the invention is to provide a trim member so that the centrifugal forces acting thereon when in operative engagement with a rotating tire and wheel assembly aid in keeping such a trim member urged against the sidewall portion of a tire.

A further object of the invention is to provide a trim member of the class described having a relatively flatly curved decorative portion and having a skirt portion extending over substantially a 90°, constant radius arc extending in an opposite direction to the curved decorative portion.

A further object of the invention is to provide an integrally molded trim member of the class described wherein the reenforcing outer edge on the trim member is relatively sharply inwardly turned with relation to the remainder of the decorative portion so that only such outer edge of the trim member and a portion at the radially inner end of the decorative portion are normally engaged with the tire sidewall and the remainder of the trim member bridges over and is slightly spaced from the tire sidewall to bridge over any raised indicia on the sidewalls of the tire.

Yet another object of the invention is to provide a flexure zone or area in a trim member to localize and concentrate the bending stresses in the molded trim member when operatively engaged with a pneumatic tire sidewall and wheel assembly, and to reenforce such sidewall trim at such flexure zone.

Yet another object of the invention is to provide a trim member of the class described wherein the radially inner portion of the rim flange engaging skirt provided on the trim member is tapered and is spaced from an associated rim base when operatively assembled therewith in order to facilitate sealing the tire in engagement with the rim side flange when the trim member is used in a tubeless tire assembly.

Another object of the invention is to provide a trim and decorative member for a pneumatic tire and wheel assembly wherein the radially outer edge of the decorative portion, as molded, generally defines a plane positioned axially inwardly of the trim member with relation to the connection of the skirt portion and decorative portions and where the trim member comprises a relatively flat decorative portion and a curved skirt portion for engaging with a tire rim flange.

Other objects and advantages of the present invention will become apparent from the following description taken in conjunction with the accompanying drawings in which.

Figure 2:
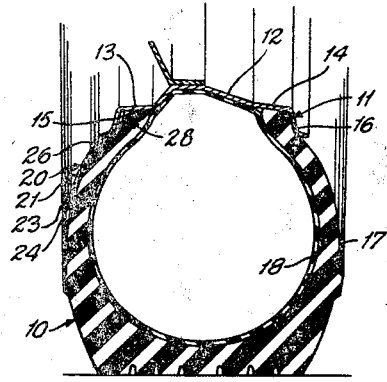
Figure 2 is an enlarged fragmentary sectional view taken on the line 2—2 of Figure 1 showing the inner tube in the tire casing fully inflated.

Referring to the drawings, the numeral 10 designates an automobile wheel assembly which includes a wheel rim 11 embodying a base or well 12, a flange 13 projecting laterally from the outer side of the base, a flange 14 projecting laterally from the inner side of the base, a side ring flange 15 projecting substantially perpendicularly from the flange 13, and a side ring flange 16 projecting substantially perpendicularly from the flange 14. A tire casing 17 is mounted on the wheel rim so that the inner peripheral edges, or beads, Figure 2, engage the lateral flanges 13 and 14 with the adjacent portions of the outer and inner side walls of the casing 17 contacting the side ring flanges 15 and 16 respectively. As shown in Figure 2, a fuly inflated inner tube 18 is housed within the tire casing 17, while in Figure 3, the inner tube 18 is shown in a deflated condition, the purpose of which will become apparent in the following description.

Figure 1:
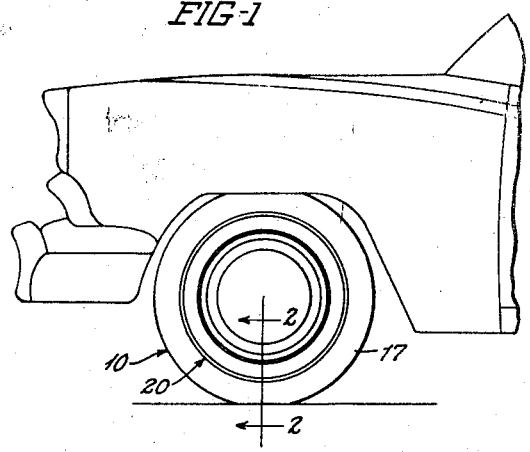
Figure 1 is a view of the front wheel assembly of an automobile equipped with the trim member of the present invention.

A trim or protective member 20, according to the present invention, is positioned so that it covers a portion of the outer side wall of the tire casing 17, Figure 1, and it has a radial length so that the outer periphery of the trim member 20 terminates just inwardly of the bulge or high central point of width of the tire casing 17, as clearly shown in Figure 2. The trim member 20 is fabricated wholly of rubber, and is white in color although other desired colors may be used. It comprises a flatly curved annular protective and decorative body 21 and a concavely curved annular skirt 22 extending about the radially inner periphery of the body 21.

Figure 6:
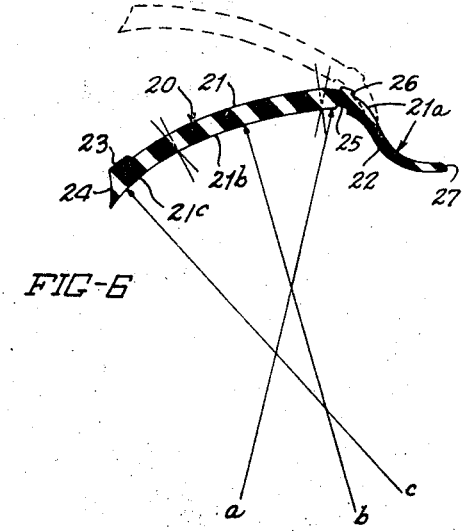
Figure 6 is a sectional view taken on the line 6—6 of Figure 5.
Figure 5:
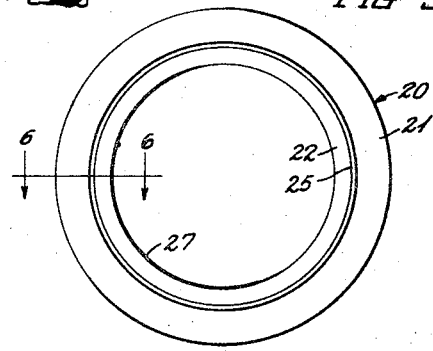
Figure 5 is a bottom plan view of the trim member of the present invention.

Figure 6 of the drawings best shows that the protective and decorative body 21 is relatively flatly curved from an overall shape view-point and has a concave surface on its inner face and a convex surface on its axially outer face. The annular skirt 22 is curved to extend in an opposite direction from the concavity of the trim member 21 and with such skirt 22 being of substantially 90° in length and being on a relatively short radius of curvature, all as indicated in the drawing.

As a feature of the invention, it has been found that the most desirable action is secured in the annular body 21 when it is made up in a plurality of arcs of equal radii but spaced centers. Thus a base section 21a is provided in the annular body 21, which extends relatively outwardly of the remainder of the trim member 20, a substantially flat center portion 21b is made in the annular body 21 that will be adapted to lie against or parallel to the sidewall portion of a pneumatic tire 17 when engaged therewith, and an end section 21c is provided and is turned relatively sharply radially inwardly with relation to the remainder of the annular body 21, all as best indicated by the three centers of curvature a, b, and c, respectively, as shown in Figure 6 of the drawing. Provision of the desired resiliency and compressive forces within the trim member 20 is insured in this particular embodiment of the invention by making the outer peripheral edge of the annular body 21 to generally define a plane positioned axially inwardly of the entire skirt portion 22 of the trim member and in all events to have such edge of the trim member define a plane positioned axially inwardly of the trim member with relation to the connection between the annular body 21 and the skirt 22.

Another feature of the invention relates to a reenforcing rib 23 provided at the radially outer peripheral edge of the annular body 21 and in the tapering or beveling of such reenforcing rib, as indicated at 24. Since this beveled edge 24 snugly engages with the tire 17 radially inwardly of the thickest or widest portion of the tire, this facilitates holding the entire annular body 21 against the tire 17 and prevents the wind or other forces from catching under the edge of such reenforcing rib 23 and causing the trim member 20 to flap or vibrate when in use and being positioned on a rotating wheel.

When the trim member 20 is operatively positioned, it will be seen that the skirt 22 is received intermediate a part of the bead of the tire 17 and the associated rim flange 15. The inherent resiliency provided in and the flexure of the integrally molded trim member 20 retains the annular body 21 portion of the trim member resiliently and snugly against the side of the pneumatic tire 17 in the operative tire assembly.

The drawing best shows that the annular body 21 is of uniform thickness throughout, but an important feature of the invention, in order to provide a localized flexing area adjacent the connection of the skirt 22 to the annular body 21, resides in providing a recess 25 on the axially inner surface of the trim member 20 adjacent the end of the annular body 21, but closely spaced with relation to the connection of such annular body to the skirt 22 by the smoothly molded integral joint provided therebetween, as shown in the drawings.

It will be realized that the trim member 20 can be made from any desirable material, but that usually the trim member is made from a relatively high grade natural rubber composition, although synthetic rubber and other rubber-like materials can be used in making the trim member, as desired. Figure 6 indicates in dotted lines the extent of flexure that the trim member 20 is forced to move through when operatively engaged with a pneumatic tire. It is important, both from a wheel balancing viewpoint and from a viewpoint of keeping the annular body 21 snugly urged against the tire sidewall, that such flexure area be localized at one zone. Furthermore, localization of the flexure of the trim member aids in obtaining a neat, attractive appearance in the trim member when operatively engaged with a pneumatic tire.

In this embodiment of the invention, I prefer to provide a reenforcing rib 26 on the outer periphery of the annular body 21 in alignment with the recess 25. Such rib 26 usually is of substantially the same size and shape of the recess 25. The reenforcing rib 26 in all events strengthens the trim member 20 in the flexure zone provided therein. The reenforcing rib 26 should not be much larger than the recess 25 for otherwise it would defeat the purpose of the flexure zone provided by the recess 25.

Figure 3:
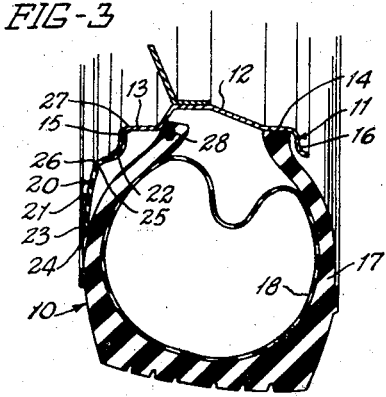
Figure 3 is a sectional view of Figure 2, but showing the inner tube in the tire casing deflated.

By making the annular body 21 of the three different curves as indicated, or by providing some special inwardly turned section on the outer peripheral edge of the annular body, the trim member 20 assumes the shape as indicated in Figure 3 when the trim member is being operatively engaged with a pneumatic tire. That is, the radially outer end of such trim member is shaped so that the beveled edge 24 extends relatively sharply radially inwardly with relation to the remainder of the annular body. As the pneumatic tire is inflated, the trim member 20 is gradually forced over to the shape as shown in Figure 2 and a flat bearing for the rib 23 on the tire sidewall.

It will be realized that both a trim or decorative action is provided by the trim member 20 whereas it also protects the tire sidewall against sharp impact with a curb or other foreign objects. When the trim member 20 and a pneumatic wheel assembly is merely brought into gradual slanting contact with a curb, then the peripheral edge of the trim member 20 and the reenforcing rib 23 will normally merely flex away from the pneumatic tire sidewall, but will immediately spring back into snug resilient contact therewith as soon as the tire is moved from contact with a curb.

Figure 4:
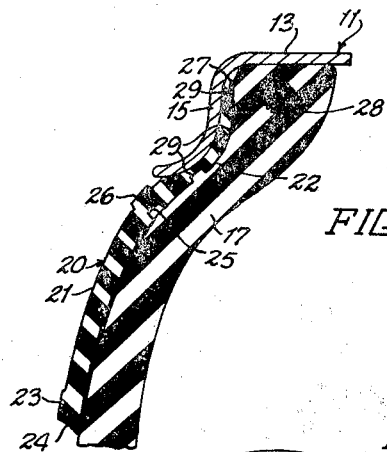
Figure 4 is an enlarged framentary sectional view of a wheel assembly having a tubeless tire casing with the trim member of the present invention applied thereto.

I prefer to have the radially inner edge of the skirt 22 positioned in radially spaced relationship to an associated rim base, as shown in Figures 2 and 3 of the drawings. This feature of the invention is particularly important when used with a tubeless tire assembly, as shown in Figure 4. In such instance, the radially inner edge of the skirt 22, as indicated at 27, gradually tapers down in thickness so that a tubeless tire 28 bearing thereagainst can readily be forced into sealing engagement with the skirt 22 and it may engage a portion of the tire rim flange 15, and the tire 28 engages a portion of the rim base 13, all as shown in the drawings. The seal of the tire 28 is produced, at least partially, by seal beads or ribs 29 provided on the tire 28. These seal beads 29 sink into the skirt 22 or else are forced to flow to fill, or partially fill the space between the end of the skirt 22, at 27, and the adjacent portion of the rim flange 15 and the rim base 13. In Figure 4, the skirt 22 is shown, for clarity, of somewhat exaggerated thickness and probably would be relatively thinner than the drawing indicates. The end 27 may be of a more gradual taper than shown to aid in the sealing action.

The ends of the sections 21a, 21b and 21c in the annular body 21 are indicated in Figure 6 by the lines parallel to the indicated radii.

Another feature of the trim member 20 is that it will bridge over associated portions of the sidewall of the tire 17, as shown best in Figure 4 of the drawings. Thus, the radially outer part of the annular body 21 adjacent the beveled edge 24 provided on the rib 23 will be in resilient contact with the sidewall, and the base section 21a of the annular body will also be in contact with such sidewall, but the center portion 21b of the annular body, at least, is slightly spaced from and bridges over part of the sidewall. This facilitates placing the trim member in engagement with a sidewall tire which may have raised marking indicia, or names, or other data, molded integrally thereon on that portion of the sidewall and the trim member still will be kept into desired resilient or hugging contact therewith.

By correlation of the radial length of the trim member 20 in relation to the tire on which it is going to be positioned and the location of the maximum width or bulge area in the tire 17, I find that centrifugal action as exerted upon the trim member 20 and particularly because of the provision of the reenforcing rib 23 on the outer peripheral edge thereof, facilitates keeping the trim member 20 smoothly and resiliently pressed against the tire sidewall when the tire is rotated.

It should be understood that the trim members of the invention are much less costly than conventional white sidewalls on pneumatic tires and further have the advantage of being movable from wheel to wheel as an owner changes cars.

In view of the foregoing, it is contended that the objects of the invention have been achieved and that an integrally molded trim member has been provided to give effective decorative and protective action in a pneumatic tire and wheel assembly, all in accordance with the objects of the invention as set forth herein.

In assembly of the trim member 20 on a tire and rim, the tire or tube must be at least partially deflated and the tire bead is broken away from the rim flange. Then the trim member can be worked over the rim flange and be seated on the inner surface of such flange. Thereafter the tire or tube is carefully inflated while being sure that the trim member is properly positioned in the tire and rim assembly.

Of course, the trim member 20 has any conventional compounding ingredients therein.

The phrase "axially inwardly" in the specification and claims means in the direction towards the arc centers $a$, $b$ and $c$ with relation to the trim member 20, as shown in Fig. 4.

While one complete embodiment of the invention has been disclosed herein, it will be appreciated that modification of this particular embodiment of the invention may be resorted to without departing from the scope of the invention as defined in the appended claims.

I claim:

1. A protective and decorative sidewall adapted to be removably mounted on the side of an operatively assembled pneumatic tire and comprising an annular body of resilient material, the body having a skirt portion and a decorative portion joined in cross section substantially at right angles to each other, the skirt portion in cross section curving radially inwardly through an arc of approximately 90° from the decorative portion and its point of joinder with the decorative portion and terminating in a tapered edge, the decorative portion extending radially outward from its point of joinder with the skirt portion but shaped to have a flatly concave side and a flatly convex side, the concave side being on the side towards which the skirt extends, the decorative portion terminating in an outer edge generally defining a plane positioned axially inwardly in the sidewall with relation to the connection of the skirt portion and decorative portion, a strengthening rib having a beveled outer edge extending circumferentially of the outer edge of the decorative portion and being inclined axially inwardly of the sidewall, the decorative portion having a circumferential groove on its concave side adjacent the point of joinder with the skirt portion, a reenforcing rib on the convex surface of the decorative portion opposite the groove, the last-named rib and groove concentrating the line of flexure between the skirt and decorative portions, said decorative portion adjacent said groove and the strengthening rib engaging with the side wall of the tire when the skirt portion is mounted between a rim flange and the tire bead and the beveled outer edge of the strengthening rib contacting the sidewall to hold the major part of the decorative portion out of engagement with the sidewall of the tire.

2. A protective and decorative sidewall adapted to be removably mounted on the side of a pneumatic tire and comprising an annular body of resilient material, the body having a skirt portion and a decorative portion joined in cross section substantially at right angles to each other, the skirt portion in cross section curving radially inwardly through an arc of approximately 90° from the decorative portion and its point of joinder with the decorative portion and terminating in a tapered edge, the decorative portion extending radially outward from its point of joinder with the skirt portion but shaped to have a flatly concave side and a flatly convex side, the concave side being on the side towards which the skirt extends, the decorative portion terminating in an outer edge generally defining a plane positioned axially inwardly in the sidewall with relation to the connection of the skirt portion and decorative portion, a strengthening rib having a beveled outer edge extending circumferentially of the outer edge of the decorative portion to provide a tapered radially outer edge therefor and being inclined axially inwardly of the sidewall, the decorative portion having a circumferential groove on its concave side adjacent the point of joinder with the skirt portion to concentrate the line of flexure between the skirt and decorative portions and the arrangement being such that when the sidewall is mounted on a tire with the skirt portion gripped between the tire bead and the rim flange the sidewall is stressed at the line of joinder between the skirt portion and the decorative portion when the decorative portion is moved into firm but resilient engagement with the sidewall of the tire.

3. A combination comprising a protective and decorative sidewall as in claim 2, a tubeless tire, and a rim having a rim base and a rim flange with the skirt portion engaged between said rim flange and tire to position the sidewall, said skirt portion being radially spaced from the rim base and having a tapered edge to facilitate sealing the tire on the rim.

4. A removable protective sidewall article for a pneumatic tire and comprising a ring-shaped resilient member adapted to be held tightly against the side of the tire by being gripped between a tire rim flange and the bead portion of the tire mounted on the rim, said member having a flatly convexedly curved decorative portion terminating in a reenforcing edge rib having a beveled radially outer surface, and a skirt with a concave outer surface integrally joined to said decorative portion on the radially inner edge thereof, said member having an unstressed shape with the end of said edge rib defining a plane positioned axially inwardly from the connection of said skirt to said decorative portion whereby said decorative portion must be moved axially outwardly in a pneumatic tire assembly when said trim member is engaged therewith to set up resilient forces in said trim member urging said edge rib against an associated pneumatic tire sidewall, said member having an annular recess on its inner surface adjacent the connection of said decorative portion and skirt to provide a flexure zone for said member when operatively positioned, and said member having a radial length as to terminate radially within the maximum width portion of a tire when operatively engaged therewith.

5. A sidewall article as in claim 4 wherein said decorative portion is integrally made in three smoothly blended arcs including a base section inclined axially outwardly of the article, an end section inclined axially inwardly of the article, and a connecting center section extending between said base and end sections.

6. A protective and decorative sidewall adapted to be removably mounted on the side of an operatively assembled pneumatic tire and comprising an annular body of resilient material, the body having a skirt portion and a decorative portion joined in cross section substantially at right angles to each other at the connecting portions thereof, the skirt portion in cross section curving radially inwardly through an arc of approximately 90° from the decorative portion and its point of joinder with the decorative portion and terminating in arc edge positioned substantially parallel with the decorative portion, the decorative portion extending radially outward from its point of joinder with the skirt portion but shaped to have a flatly concave side and a flatly convex side, the concave side being on the side towards which the skirt extends, the decorative portion terminating in an outer edge generally defining a plane positioned axially inwardly in the sidewall with relation to the connection of the skirt portion and decorative portion, a strengthening rib having a beveled outer edge of substantially the same radial length as the strengthening rib which is at the circumference of the outer edge of the decorative portion and adapted to be positioned radially within the maximum width portion of a tire when operatively engaged therewith, and a reenforcing rib on the convex surface of the decorative portion adjacent its connection to the skirt portion to aid in concentrating the line of flexure between the skirt and decorative portions.

References Cited in the file of this patent

UNITED STATES PATENTS

| | | |
|---|---|---|
| 2,573,996 | Spencer | Nov. 6, 1951 |
| 2,621,979 | Barnes | Dec. 16, 1952 |
| 2,691,550 | Nickerson | Oct. 12, 1954 |
| 2,696,409 | Barnes | Dec. 7, 1954 |

FOREIGN PATENTS

| | | |
|---|---|---|
| 1,061,278 | France | Nov. 25, 1953 |